(12) United States Patent
Ward

(10) Patent No.: US 7,189,005 B2
(45) Date of Patent: Mar. 13, 2007

(54) BEARING SYSTEM FOR A TURBOCHARGER

(75) Inventor: Daniel N. Ward, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/079,416

(22) Filed: Mar. 14, 2005

(65) Prior Publication Data
US 2006/0204154 A1   Sep. 14, 2006

(51) Int. Cl.
*F16C 17/18* (2006.01)
(52) U.S. Cl. ..................... 384/286; 384/901
(58) Field of Classification Search .............. 384/99, 384/286, 287, 322, 398, 901; 417/407
See application file for complete search history.

(56) References Cited

U.S. PATENT DOCUMENTS

| 3,058,787 A | * | 10/1962 | Bernson | 384/287 |
| 4,358,253 A | * | 11/1982 | Okano et al. | 417/407 |
| 4,427,309 A | * | 1/1984 | Blake | 384/286 |
| 4,902,144 A | * | 2/1990 | Thoren | 384/398 |

* cited by examiner

*Primary Examiner*—Thomas R. Hannon
(74) *Attorney, Agent, or Firm*—Stephen A. Pendorf; Akerman Senterfitt; Greg Dziegielewski

(57) ABSTRACT

A bearing system for a turbocharger, simple in design and easy to manufacture, having desired rotational dynamics of a three piece bearing design, yet having the superior vibration damping characteristics of a one piece bearing design. The inboard end of each journal bearing includes an axial recess for receiving an outboard end of a cylindrical bearing spacer, thereby axially locating the journal bearings as well as axially and radially locating the bearing spacer.

10 Claims, 3 Drawing Sheets

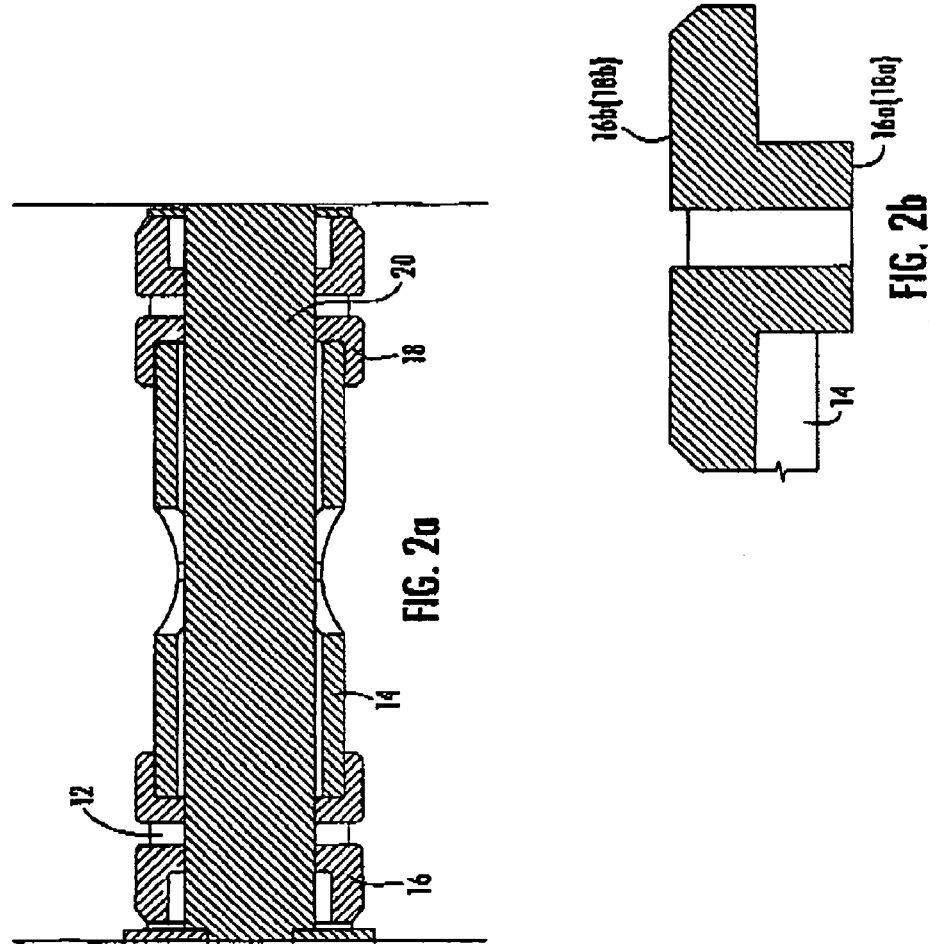

BEARING SYSTEM FOR A TURBOCHARGER

FIELD OF THE INVENTION

The present invention relates to a turbocharger for an internal combustion engine and more particularly to an improved turbocharger journal bearing and bearing spacer system.

BACKGROUND OF THE INVENTION

Turbochargers are unique mechanical devices in that they are expected to operate at extremely high RPM under conditions of high temperature and changing load, and yet are expected to provide long trouble-free service.

More specifically, a turbocharger is a type of forced induction system. Engine exhaust gases drive a turbine. The turbine is connected via a shaft to a compressor. Ambient air is compressed by the compressor and is fed into the intake manifold of the engine, allowing the engine to combust more fuel, and thus to produce more power for a given displacement. Considering the volumetric gas intake requirements of an engine operating at peak performance and the comparatively small size of a turbocharger, it can be appreciated that a turbocharger may be expected to rotate at speeds of up to 300,000 rpm.

The basic purpose of a bearing system is to provide a near frictionless environment to support and guide this rapidly rotating shaft over the life of the turbocharger, which should ideally correspond to that of the engine, which could be 500,000–1,000,000 km. The bearing system usually comprises two spaced-apart bearings, which function to dampen oscillations. Considering that the turbine is driven by engine exhaust gas, which may have a temperature as high as 1,300 F, it will be apparent that the bearing system must be designed so that a sufficient amount of lubricant is always channeled through the bearing system for removal of heat. Obviously, the turbocharger bearing system is a critical system that must be highly engineered.

On the other hand, it is highly desirable to design a turbocharger that is comprised of a minimum number of parts, which parts are easy to manufacture and easy to assemble, while still satisfying the demand for extended service life. Significant design effort has been directed toward improvements in turbocharger bearing systems.

In one popular turbocharger design the shaft is supported by a pair of floating radial bearings arranged in a cylindrical bore formed in the center housing (also referred to as the bearing housing) of the turbocharger. In this conventional bearing arrangement, the axial movement of each of the floating radial bearing is restricted by a pair of snap rings which are fitted into ring grooves formed on the inner wall of a cylindrical bore through the turbocharger center housing. See, for example, the turbocharger journal bearings described in U.S. Pat. Nos. 3,058,787 and 4,427,309. However, in the case wherein the floating radial bearings are axially restricted by a pair of snap rings, a problem occurs in that the end faces of the rapidly rotating floating radial bearings contact the stationary snap rings. This contact not only causes friction wear at the contact area, it may change the rotational speed of the bearing. In addition, a complicated machining process is necessary to form the four ring grooves on the inner wall of the cylindrical bore into which the snap rings must be seated, and, as a result, the manufacturing cost of the turbocharger is increased. Further, the seating of four snap rings is labor intensive. As the expected life of the engine increases, the turbocharger must be engineered for longer life.

An improvement came with the evolution of the "one piece" radial bearing assembly, in which the pair of floating radial bearings is connected by a cylindrical spacer. This eliminated the need for the respective inboard snap rings, and consequently reducing machining and assembly costs. Being one solid piece, this design was thought to provide good vibration damping characteristics. However, in such a radial bearing assembly, since the axial length of the radial bearing assembly is very long, and since the two bearings are rigidly connected and can not independently optimally adjust their position in the bore, there was a problem in that a complicated and precise machining process was necessary. In addition, since the bearing assembly is one continuous piece, any vibration due to shaft dynamics at one bearing end is instantly communicated to the other bearing end, and further, heat from the turbine side bearing is conducted through the thermally conductive metal spacer cylinder to the compressor side bearing. In addition, lubricating oil located in the sliding zone of the floating radial bearings cannot easily escape, and the friction loss of the floating radial bearings is increased.

In view of the above, U.S. Pat. No. 4,358,253 proposed to install a separate cylindrical "bearing spacer" axially between the pair of journal bearings. This bearing spacer was in the form of a tube in the space between a stationary housing and the rapidly rotating shaft. However, given the rapid flow of oil in this space, in order to stabilize and prevent "wobble" of the bearing spacer, the spacer was given an outer diameter corresponding substantially to that of the outer diameter of the bore. This greatly diminished or even completely stopped the rotation of the spacer, and thus prevented wobble. However, this spacer design tends to impede oil flow. Further, since the bearing spacer exhibits little or no rotational speed, wear is produced where the spacer contacts the rapidly rotating journal bearings. Further yet, given the high rotational speed of the shaft, the stationary spacer introduces drag and contributing to accelerated oil degradation in the space between the shaft and spacer.

It has also been proposed to utilize a bearing spacer having an inner diameter corresponding substantially to the outer diameter of the roatary shaft. While this snug fit would prevent wobble, such a close fit between bearing spacer and shaft causes the bearing spacer to rotate a high speed, causing shear and oil degradation, as well as drag on the shaft.

These prior designs utilizing a separate central bearing spacer have all proven satisfactory with regard to providing proper axial spacing of the radial bearings. However, the need to prevent wobble of the bearing spacer required the bearing spacer, if not integral with the bearings, to be either snugly fit to the shaft or snugly fit the bearing housing bore. These designs, though overcoming the problems associated with the four snap-ring design, have not provided adequate oil flow over and about the inner and outer diameter surfaces of the journal bearings and have not achieved satisfactory rotational speeds of the bearing spacer for reduction in drag, and as a result have suffered from relatively premature journal bearing failure.

As an improvement over the above described bearing spacers is provided in U.S. Pat. No. 4,902,144 entitled "Turbocharger Bearing Assembly", teaching a bearing design employing a pair of journal bearings separated by a floating central spacer. The generally cylindrical, rotationally floating bearing spacer has opposite ends defining a pair of axially outwardly presented inboard thrust surfaces to maintain the two journal bearings in precision axial spaced relation. For radially locating or "piloting" the bearing spacer within the center housing bearing bore, the spacer exhibits pilot means radiating outwardly from the spacer outer diameter. This design allows unimpeded oil flow and thus achieves an improved oil flow over the journal bearings in comparison to the bearing system described in U.S. Pat. No. 4,358,253. However, the design of the bearing spacer is complex and thus is associated with manufacturing expense. Further, considering the changes in temperature, viscosity, and rotational speed of the turbocharger, it is difficult to design the spacer to have optimal rotational speeds over the entire rotational speed range of the turbocharger rotary shaft. Further yet, the three-piece design with the freely-floating bearing spacer lacks the inertia related stabilizing effect of the one-piece bearing spacer on any radial or rotational vibration of the journal bearings. Thus, one of the advantages of the "one piece" bearing system is missing in this "three piece" bearing system design.

Accordingly, there is a need for a simpler, easier to manufacture, lower cost bearing system for a turbocharger that achieves desired rotational dynamics of the three piece design, yet achieves the superior vibration damping characteristics of the one piece design, and yet does not suffer from the requirement for precise machining of the one-piece bearing.

SUMMARY OF THE INVENTION

The present invention overcomes the problems and disadvantages encountered in the prior art by providing an improved turbocharger bearing system wherein the bearing spacer is not only axially located by the bearings, but is additionally radial located by the bearings.

For this, the bearing inboard faces are provided with either a cylindrical axial protrusion or recess, and the bearing spacer is provided with a mating recess or protrusion, such that the bearing spacer is both axially and radially constrained.

Since the bearing spacer has a greater amount of surface area in contact with the bearings, it will rotate at approximately the same speed as the bearings, which is optimal. Since the bearing spacer does not have radial "pilot" protrusions, it will not cause shear of oil, will not introduce drag to impede rotation of the turbocharger. Since the bearing system is not a one-piece system, it will fit to the turbocharger without requiring precise machining. Since the bearing spacer is radially supported by the bearings, vibration can be transmitted from one bearing to the other to a limited extent, thus providing some inertial damping of vibration not possible with a free-floating bearing spacer. Since the three bearing pieces rotate at the same speed, friction wear is reduced. Since the bearing spacer is radially supported, the bearing spacer exhibits resistance to wobble. The invention also provides a bearing system that is simple and relatively inexpensive to manufacture, easy to assemble, and is highly durable.

BRIEF DESCRIPTION OF THE DRAWINGS

The present invention is illustrated by way of example and not limitation in the accompanying drawings in which like reference numbers indicate similar parts, and in which:

FIG. 2a is an enlarged, cross-sectional view of a preferred embodiment of the bearing system of the present invention.

FIGS. 2b–d show details of three possible designs of bearings securing the bearing spacer axially as well as radially.

DETAILED DESCRIPTION OF THE INVENTION

Figure 1:
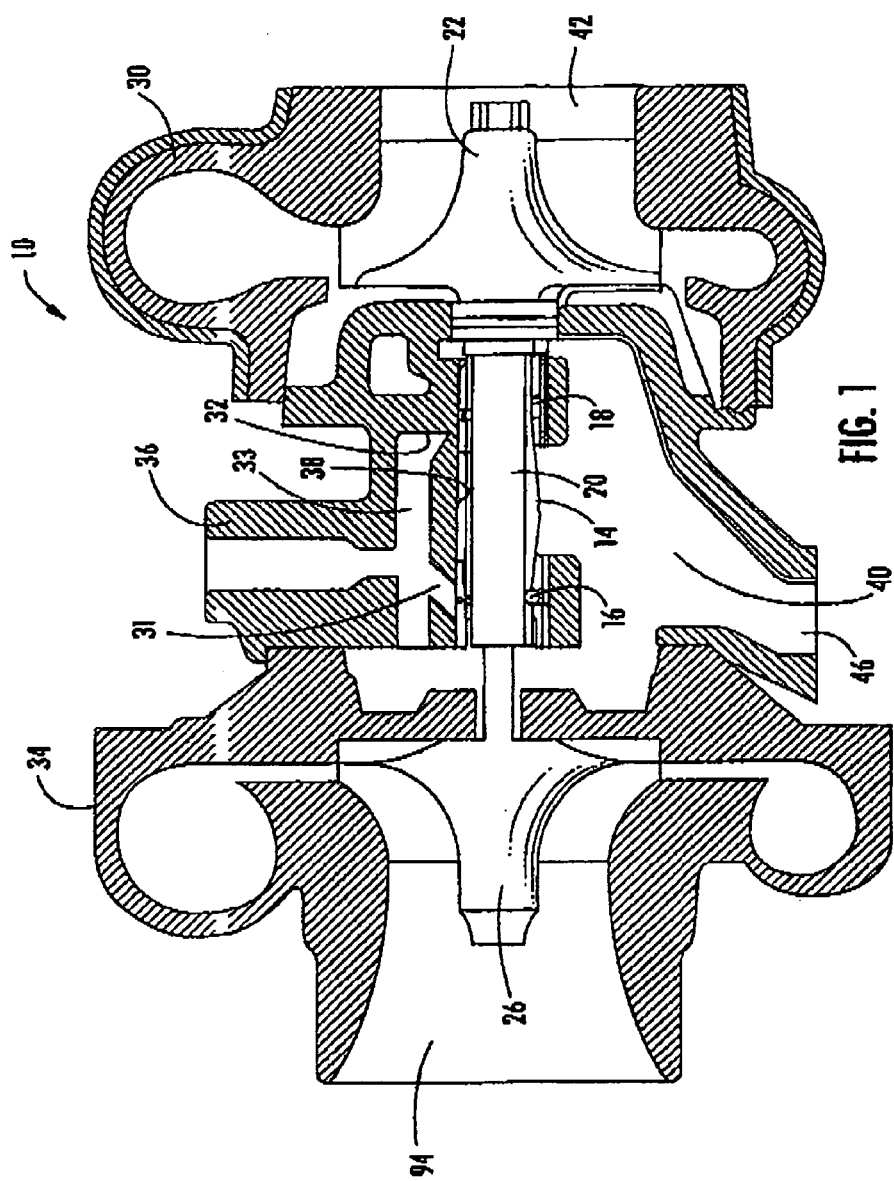
FIG. 1 is a side cross-sectional view of a turbocharger incorporating a bearing system constructed in accordance with the present invention.

The illustrative turbocharger 10 depicted in FIG. 1 includes turbine wheel in a turbine housing, a compressor wheel in a compressor housing, a shaft connecting the two wheels, and a bearing system for rotationally and axially supporting the shaft.

The turbine more specifically comprises a turbine wheel 22 and a turbine housing 30 such that exhaust gas is guided to the turbine wheel 22 by the housing. The inertia and expansion energy in the exhaust gas turns the turbine. Once the gas has passed through the blades of the turbine wheel it leaves the turbine housing 30 via the exhaust outlet area 42. If the engine is in idle mode the wheel will be spinning at a lower speed, and as more gas passes through the turbine housing the turbine wheel will rotate faster.

The function of the compressor is opposite to that of turbines. The compressor uses the energy, which has been extracted from the exhaust gas in the turbine by slowing and expanding (thereby cooling), in order to accelerate and compress (thereby heating) ambient air for the engine intake. The compressor is comprised of two sections—the compressor wheel 26 and the compressor housing 34. The compressor wheel 26 is connected to the turbine by a shaft 20. As the compressor wheel 26 spins, air is drawn in via an air inlet 44 and is compressed as the blades spin at a high velocity. The compressor housing 34 includes a volute portion designed to convert the high velocity, low pressure air stream into a high pressure, low velocity air stream through a diffusion process, thereby providing increased mass flow through the engine for increased performance and power output.

The turbocharger of the present invention includes an improved bearing arrangement for rotatably supporting the shaft 20. The journal bearings 16 and 18 are of the free-floating rotational type. The journal bearing has inner and outer bearing surfaces. Usually the speed differential between the shaft and the journal bearing inner bearing surface is very high, and the speed differential between a journal bearing outer bearing surface and bearing housing is comparatively low. Thus, the oil film on the outer diameter of the journal bearing acts as a damper, and does not experience a high shear rate. The inner diameter of the journal bearing is smaller than the outer diameter. Thus, although higher shear forces act on the inner diameter of the journal bearing, the smaller total surface area of the journal inner bearing surface ensures that the journal bearing does not rotate too rapidly. The surface areas can be adjusted by beveling or otherwise reducing surface area.

The turbocharger bearing system is lubricated by oil from the engine. The oil is fed under pressure into the bearing housing 36 to lubricate the bearing surfaces within and about the journal bearings. Oil passes through individual bearing supply ports 31 and 32 for lubricating the journal bearings 16 and 18. These supply ports 31 and 32 open at generally axially centered positions with respect to the two journal bearings, such that oil flow may occur in both directions axially to lubricate the bearing surfaces. Journal bearings 16 and 18 have axially centered lubricating oil flow bores 12. Oil flowing over and through the journal bearings 16 and 18 is eventually collected within a bearing housing sump chamber 40 for return circulation through an outlet port 46.

As shown in more detail in FIG. 2a, the journal bearings 16 and 18 have a generally conventional sleeve bearing construction which can be formed by various manufacturing techniques utilizing a variety of known bearing materials, such as leaded or unleaded bronze, aluminum, etc. The journal bearings 16 and 18 have inner diameter surfaces sized to fit with relatively close clearance about the shaft 20.

As in the the prior art, the improved turbocharger bearing assembly includes bearing spacer 14 for precise axial location and retention of the journal bearings 16 and 18. In contrast to the prior art, the journal bearings 16 and 18 provide secure radial location and retention of the bearing spacer 14 for effectively substantial clearance relative to the shaft 20 and the bearing bore 38, respectively, to permit substantially unimpeded oil flow from the journal bearings in the inboard direction and to provide acceptable rotational speed of the journal bearings 16 and 18 and bearing spacer 14 at different shaft rotational speeds. The journal bearings are not rigidly connected to the bearing spacer, thus they can conform to the alignment and geometry of the bearing bores, and there is no critical requirement for precise machining as in the case of the prior art one-piece bearing spacer.

More specifically, the journal bearings 16 and 18 are each constructed such that, in the inward facing axial thrust surface, a shape such as a step or recess or cylinder is formed 16a (18a). The bearing spacer outer thrust surfaces are adapted to fit freely slidingly in these recesses. The invention is characterized by an area of axial overlap between bearing and bearing spacer, such that the bearing spacer is radially located.

The provision of the recess in the bearings 16 and 18 provides a relatively simple design adapted to locate and retain the bearing spacer 14 in precision spaced relation.

In addition, the journal bearings 16 and 18 include outer diameter surfaces sized to fit with relatively close clearance within an axially elongated bearing bore 38 formed within the bearing housing 36. In the preferred form, the bearing bore 38 has a uniform diametric size to permit simple slide-in reception of the journal bearings, which are sized in turn for rotational floating within the bearing bore 38 during rotation of the shaft 20.

The bearing spacer 14 provides a component adapted to locate and retain the bearings 16 and 18 in precision spaced relation. The spacer 14 can be constructed from a low cost plastic selected to withstand typical turbocharger operating temperature ranges. If constructed of metal, the thickness of the bearing spacer need not be substantial. The bearing spacer may even be formed from a sheet of metal rolled into a tube, such that insertion of this sub into cylindrical recesses in the bearings prevents opening of the tube.

As shown in FIG. 2a, the outer diameter of the spacer 14 is formed on a diameter substantially less than the outer diameters of the journal bearings 16 and 18. Similarly, the inner diameter of the bearing spacer 14 is formed on a diameter significantly greater than the inner diameter of the journal bearings 16 and 18. Furthermore, the spacer 14 has large lubricating oil flow central output opening.

The improved turbocharger bearing assembly of the present invention thus provides relatively simple bearing components which can be installed by simple slide mounting onto the turbocharger shaft and within the bearing bore, as part of the overall turbocharger assembly process.

Figure 2C:
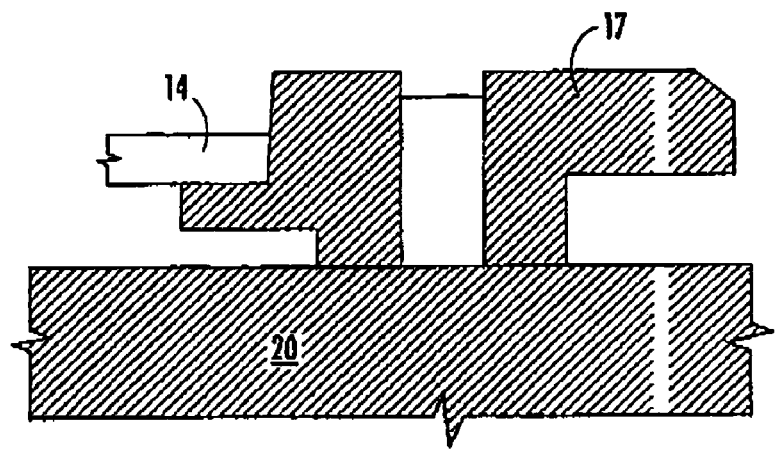
Figure 2D:
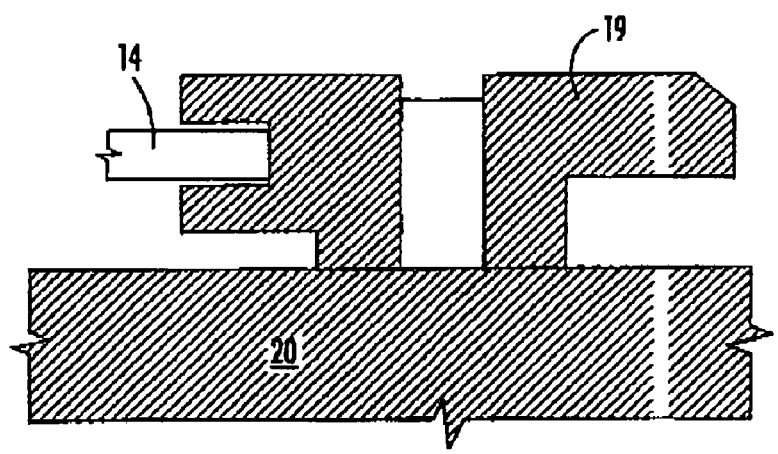

Although the bearing system has been shown in FIG. 2a with the radially-locating step in the bearing being radially outward of the bearing spacer as shown in greater detail in FIG. 2b, the invention is not limited to this embodiment, but includes embodiments wherein the step formed in the bearing is located radially inside of the bearing spacer as shown in FIG. 2c, or the bearing may have two steps, one radially ouside and one radially inside the bearing as shown in FIG. 2d.

While the invention has been described by reference to a specific embodiment chosen for purposes of illustration, it should be apparent that numerous modifications could be made thereto by those skilled in the art without departing from the spirit and scope of the invention.

The contact surface between bearing spacer and bearing need not be perfectly cylindrical. The ends of the spacer could be castellated, or the bearing inward facing sufaces could be a series of protrusions. However, for manufacturing purposes, the cylindrical design shown in the figures is easiest to produce.

Importantly, the improved bearing system comprises relatively simple components adapted for rapid yet accurate assembly to reduce the overall manufacturing complexity and cost of the turbocharger. Moreover, the bearing components are designed for enhanced bearing oil flow to achieve prolonged bearing life with minimal heating and wear. It is to be understood, however, that the bearing structure of the present invention is useful in conjunction with a variety of turbocharger assemblies, and is not to be limited to use with the particular turbocharger described herein.

Now that the invention has been described,

I claim:

1. A turbocharger bearing assembly comprising:
   a bearing housing (16) having a bore (38) extending therethrough;
   a shaft (26) extending through said bore (38);
   a pair of floating journal bearings (44,46) rotatably mounted within said bore (38) and rotationally supporting said shaft; and
   a generally cylindrical bearing spacer axially interposed between said journal bearings;
   wherein said journal bearings axially overlap with, and thereby radially locate, said bearing spacer.

2. The bearing assembly as in claim 1, wherein the outer diameter of said bearing spacer is smaller than the outer diameter of said journal bearings.

3. The bearing assembly as in claim 1, wherein the inner diameter of said bearing spacer is greater than the inner diameter of said journal bearings.

4. The bearing assembly as in claim 1, wherein said inboard ends of said journal bearings respectively exhibit a circumferential step, and wherein said bearing spacer is radially supported against the radially inside surface of said circumferential step.

5. The bearing assembly as in claim 1, wherein said inboard ends of said journal bearings respectively exhibit a circumferential step, and wherein said bearing spacer is radially supported against the radially outside surface of said circumferential step.

6. The bearing assembly as in claim 1, wherein said inboard ends of said journal bearings respectively exhibit first and second circumferential steps, and wherein said bearing spacer is radially supported against the radially inside surface of one of said circumferential steps and is radially supported against the radially outside surface of the other of said circumferential steps.

7. The turbocharger bearing system of claim 6, wherein said journal bearings have an axially centered lubricating radial oil flow bores.

8. The bearing assembly as in claim 6, wherein said bearing spacer includes openings through which lubrication oil can flow.

9. The bearing assembly as in claim 1, wherein said housing (16) further includes an inlet port (54) for a lubricant, said inlet port (54) being in communication with lubricating oil channels, said oil channels directed to the top of the journal bearings (44, 46).

10. A bearing assembly comprising:
 a bearing housing (16) having a bore (38) extending therethrough;
 a shaft (26) extending through said bore (38) and adapted to rotate at high speed with respect to said housing (16) and being subjected to axial thrust forces applied thereto in both axial directions;
 a pair of floating journal bearings (44,46) rotatably mounted within said bore (38) and rotationally supporting said shaft, each journal bearing having an inner surface in proximity to and encompassing a shaft portion and an outer surface in proximity to said bore (38), each journal bearing (44, 46) further having an inboard end and an outboard end; and
 a generally cylindrical bearing spacer axially interposed between said journal bearings, the inner diameter of said spacer being greater than the outer diameter of said shaft, and the outer diameter of said spacer being smaller than the inner diameter of said bore (38);
 wherein the outer surface area of each journal bearing is greater than the inner surface area, and
 wherein said inboard end of each journal bearing includes an axial recess for receiving an outboard end of said bearing spacer, the bearing spacer thereby axially locating said journal bearings, and the journal bearings radially locating said bearing spacer.

* * * * *